US012103692B2

(12) United States Patent
Matson et al.

(10) Patent No.: US 12,103,692 B2
(45) Date of Patent: Oct. 1, 2024

(54) ENGINE TRUSS FOR AIRCRAFT

(71) Applicant: Textron Aviation Inc., Wichita, KS (US)

(72) Inventors: Zachary Richard Matson, Derby, KS (US); Clark Ray Miller, Wichita, KS (US); Shawn Durwin Doggett, Wichita, KS (US); Jennifer Lynn Graham-Rateliff, Wichita, KS (US); Craig James Brownell, Goddard, KS (US)

(73) Assignee: Textron Innovations Inc., Providence, RI (US)

( * ) Notice: Subject to any disclaimer, the term of this patent is extended or adjusted under 35 U.S.C. 154(b) by 38 days.

(21) Appl. No.: 18/068,693

(22) Filed: Dec. 20, 2022

(65) Prior Publication Data

US 2023/0192306 A1 Jun. 22, 2023

Related U.S. Application Data

(60) Provisional application No. 63/291,658, filed on Dec. 20, 2021.

(51) Int. Cl.
*B64D 27/40* (2024.01)
(52) U.S. Cl.
CPC .................. *B64D 27/40* (2024.01)

(58) Field of Classification Search
CPC .... B64D 27/40; B64D 27/402; B64D 27/404; B64D 27/406
See application file for complete search history.

(56) References Cited

U.S. PATENT DOCUMENTS

| 3,502,287 | A | 3/1970 | Lindsay |
| 10,144,526 | B2 * | 12/2018 | Zameroski .......... G06F 11/3466 |
| 10,899,462 | B2 | 1/2021 | Zameroski et al. |
| 2010/0155525 | A1 * | 6/2010 | Stuart .................... B64D 29/00 244/54 |

FOREIGN PATENT DOCUMENTS

WO WO-2016112187 A2 * 7/2016 ............. B64D 27/26

* cited by examiner

*Primary Examiner* — Timothy D Collins
*Assistant Examiner* — Eric Acosta
(74) *Attorney, Agent, or Firm* — AVEK IP, LLC

(57) ABSTRACT

An engine support truss assembly for aircraft includes a mounting plate having a front side and a back side opposite the front side, a truss structure mechanically coupled to the front side of the mounting plate, and a backup structure mechanically coupled to the back side of the mounting plate. The truss structure includes a plurality of structural members each including precipitation-hardened stainless steel. The backup structure is configured to provide mechanical support to the truss structure.

12 Claims, 10 Drawing Sheets

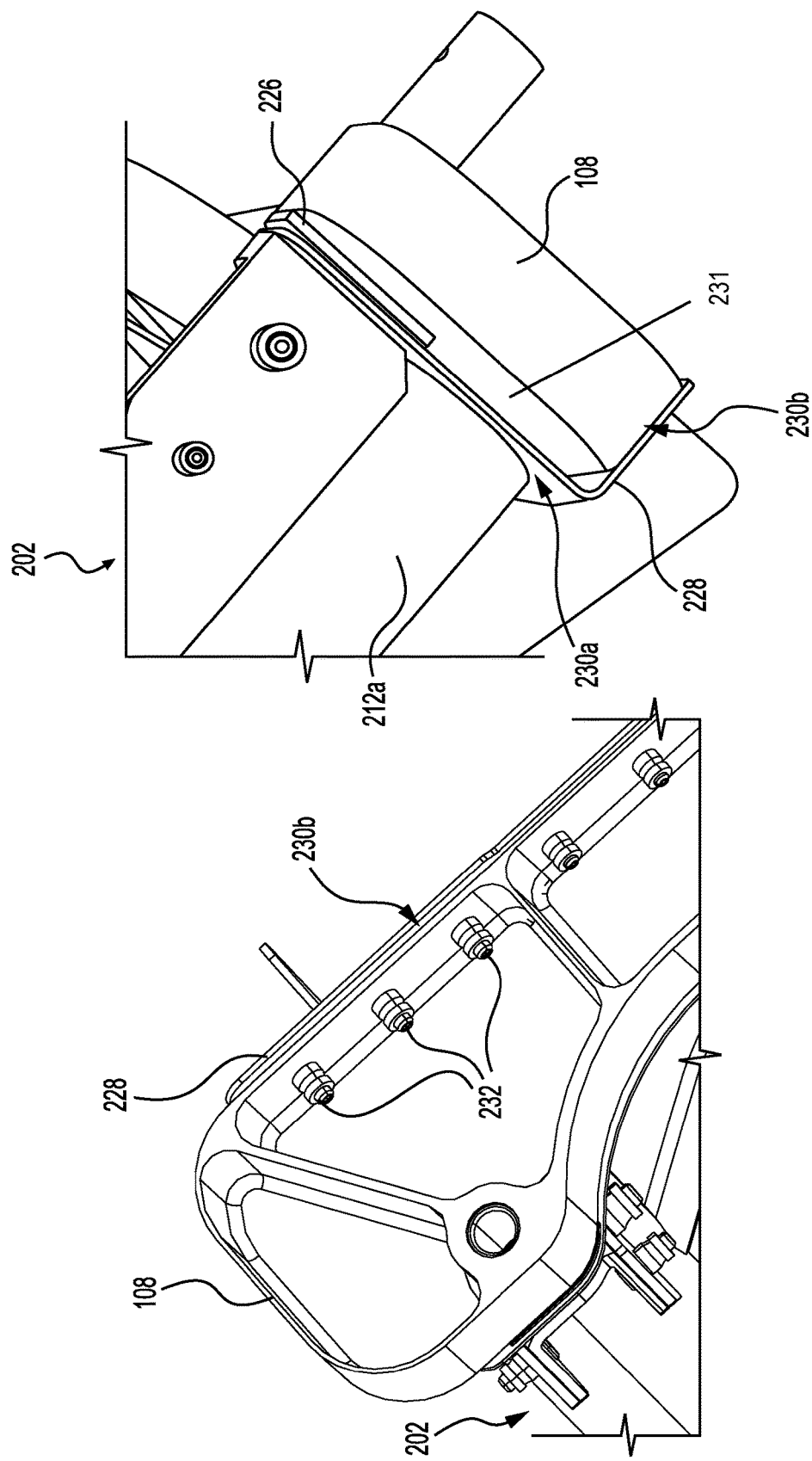

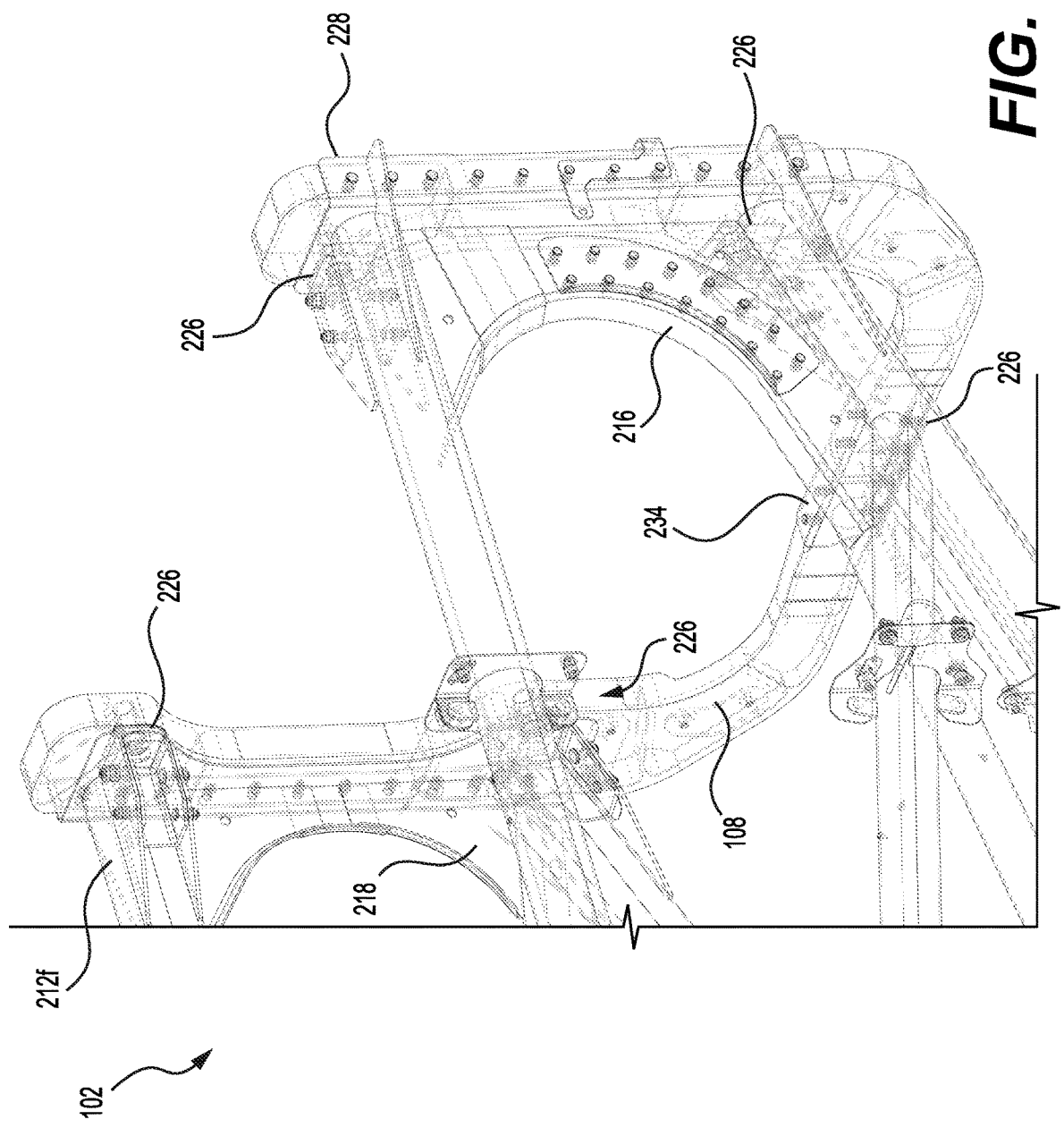

ENGINE TRUSS FOR AIRCRAFT

CROSS-REFERENCE TO RELATED APPLICATIONS

This application claims the benefit of priority of U.S. Provisional Patent Application No. 63/291,658, entitled "Engine Truss for Aircraft", and filed on Dec. 20, 2021, the disclosure of which is herein incorporated by reference in its entirety.

BACKGROUND OF THE INVENTION

1. Field

The disclosed embodiments relate generally to aircraft structural integrity. More specifically, the embodiments relate to a tubular truss/frame structure for an aircraft engine.

2. Description of the Related Art

Truss structures for supporting aircraft engines are known. For example, U.S. Pat. No. 10,144,526 to Zameroski et al. discloses an engine attachment system having isolators integrated with a forward and an aft collar and a left, a right, and an upper truss assembly, with the truss assemblies having a plurality of struts connecting the forward collar to the aft collar. U.S. Pat. No. 10,899,462 to Zameroski et al. discloses a similar engine attachment system with anti-torque capabilities. U.S. Pat. No. 3,502,287 to Lindsay discloses an aircraft engine mounting system having a cantilevered support structure mounted to a structural wall with struts extending from the structural wall to an elliptical support wall.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, an engine support truss assembly for aircraft includes a mounting plate having a front side and a back side opposite the front side, a truss structure mechanically coupled to the front side of the mounting plate, and a backup structure mechanically coupled to the back side of the mounting plate. The truss structure includes a plurality of structural members each including precipitation-hardened stainless steel. The backup structure is configured to provide mechanical support to the truss structure.

In another embodiment, a primary truss structure includes a plurality of 17-4PH structural members each including precipitation-hardened stainless steel. A secondary truss structure includes a plurality of structural members configured to provide mechanical support to the primary truss structure. A mounting plate has a first side configured for mounting to the primary truss structure and a second side configured for mounting to the secondary truss structure. A machined collar is mechanically coupled to the primary truss structure opposite the mounting plate. A plurality of vibration isolators are mounted externally to the collar. The vibration isolators are configured to abut an engine for dampening vibrations transferred from the engine to the engine truss.

BRIEF DESCRIPTION OF THE SEVERAL VIEWS OF THE DRAWINGS

Illustrative embodiments are described in detail below with reference to the attached drawing figures, which are incorporated by reference herein and wherein:

FIG. 2E illustrates a side flange for receiving a pre-defined shim for the engine support truss assembly for some embodiments;

FIG. 2F illustrates a pre-defined shim for the engine support truss assembly for some embodiments;

FIG. 2G illustrates locations of pre-defined shims for the engine support truss assembly for some embodiments;

Figure 1:
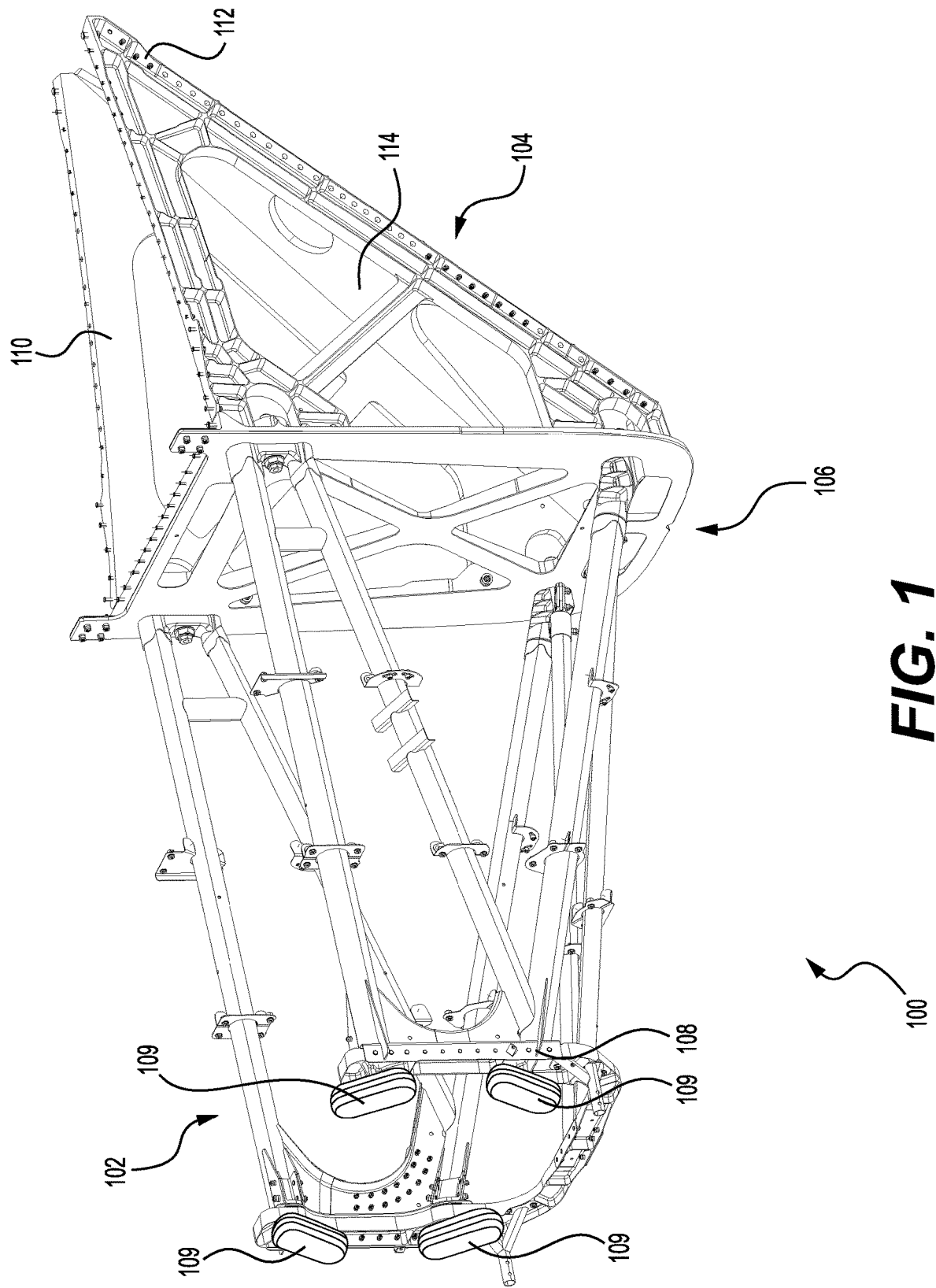
FIG. 1 illustrates an engine support truss assembly for some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

An improved engine truss is needed that can be fabricated from a stronger, lighter alloy than typical engine trusses to meet modern aircraft requirements. Typical engine trusses are made from 4130 alloy steel in the normalized heat treat condition. Engine trusses made from 4130 alloy steel in normalized condition are typically heavy and bulky due to the lower strength of 4130 steel in the normalized condition as compared to other quench and temper heat treat conditions (e.g., precipitation-hardened steel). 4130 steel is also unable to be heat-treated to a higher strength without cracking and/or distorting the truss. 4130 alloy steel in the normalized condition may be insufficient to fabricate a truss that meets weight and space requirements of modern aircraft.

Further, what is needed is an improved collar for engine trusses that reduces dimensional error and eliminates the need for shimming the engine truss to achieve a desired thrust angle. Furthermore, what is needed are improved truss nodes that enable improved producibility such that the truss nodes may be robotically welded.

Embodiments disclosed herein are generally directed to an engine support truss assembly for use in aircraft. The engine support truss assembly may comprise a truss, a backup structure, and a mounting plate. The truss may be connected to a front side of the mounting plate, and the backup structure may be connected to a back side of the mounting plate. The truss may comprise a plurality of structural members arranged to support an engine. The truss may be fabricated from 17-4 precipitation-hardened stainless steel (17-4PH) that allows for a lighter and smaller truss as compared to existing engine trusses made from conventional materials. Alternatively, or additionally, other precipitation-hardened (PH) stainless steel alloys may be used in embodiments herein, such as 17-7PH, 15-5PH, stainless steel custom 465 alloy, or austenitic A286 stainless steel, or any combination thereof.

The engine truss may comprise a machined collar that allows for improved adjustability of the thrust angle. By machining the collar, dimensional error may be reduced as compared to traditional bent tube collars of traditional engine trusses. The collar may comprise a designed-in slip plane at an interface between the collar and the main truss body. The slip plane may allow for the engine mount angle to be adjusted with a pre-defined shim (instead of requiring a separate shimming step to be performed) where one or more shims are subsequently inserted at the interface. The pre-defined shim is added during the buildup of the assembly, as opposed to traditional shimming that is used to make adjustments or fill in gaps after the assembly has been built. The engine truss may also comprise machined truss nodes for connecting the thin-walled truss members to one another and to other components of the engine truss support assembly. The truss nodes may comprise a fitting for inserting truss members therein, rather than welding the truss members to one another thereby increasing the available space to weld the engine truss. As such, improved weldability and the ability to robotically weld the engine truss may be obtained.

FIG. 1 illustrates an engine support truss assembly 100 for some embodiments. Engine support truss assembly 100 may comprise a truss 102, a backup structure 104, and a mounting plate 106. In some embodiments, engine support truss assembly 100 is attached at an aircraft firewall. In some embodiments, engine support truss assembly 100 is mounted in a wing root, mounted in pods under a wing, mounted inside an aircraft tail, or mounted on pods of a rear fuselage. Broadly, engine support truss assembly 100 may be fastened in various locations to the aircraft structure. In some embodiments, backup structure 104 is mechanically coupled to the aircraft structure, while truss 102 is mechanically coupled to backup structure 104 via mounting plate 106. For example, backup structure 104 may be assembled with fasteners and then installed to the aircraft structure with fasteners; truss 102 may be coupled to mounting plate 106 via a heavy duty bolt-in-bolt concept for failsafe redundancy; backup structure 104 may be coupled to mounting plate 106 with fasteners. Backup structure 104 provides additional support to truss 102 when an engine is mounted thereto (see FIG. 2D). Truss 102 may be connected to backup structure 104 via mounting plate 106 as shown. Truss 102 may also be coupled to a collar 108 on which isolators 109 may be disposed. Collar 108 may be a substantially U-shaped collar. Collar 108 may be referred to or known in the relevant art as a horse collar. Isolators 109 may connect to and mitigate vibration from the engine, as discussed further below with respect to FIG. 2D.

In some embodiments, truss 102 comprises a plurality of tubes, sheets, bars, and other like structural members. Truss 102 may be fabricated from stainless steel, such as 17-4PH steel. Compared to 4130 alloy steel in the normalized condition, that is traditionally used for truss-mounted engine assemblies, 17-4PH steel provides a number of advantages. Because of the higher strength of precipitation-hardened 17-4 steel compared to 4130 steel in the normalized condition, truss 102 may be fabricated at a lighter weight for supporting the same engine than with 4130 steel in the normalized condition. 17-4PH steel is able to undergo quench and temper heat treat conditions (e.g., precipitation-hardening) to provide a higher-strength material. As such, tubes and other structural members may be shrunk for truss 102 compared to conventional truss structures. Further, 17-4PH steel may not require post-processing steps, such as oil finishing or post-weld corrosion protection processing, that is required for 4130 steels. As such, both cost and weight may be reduced for truss 102. Additionally, 17-4PH steel may provide a higher endurance limit and increased corrosion-resistance compared to 4130 alloy steels. In some embodiments, the components of truss 102 are welded together. In some embodiments, the components of truss 102 are configured to be robotically welded together.

In some embodiments, backup structure 104 provides additional support to truss 102 when mounting an engine thereto. Backup structure 104 may comprise a left support 112 and a right support 110, as depicted in FIG. 1, and a connecting piece 114 disposed between a portion of left support 112 and right support 110. Supports 110, 112 may be connected to a backside of mounting plate 106. Connecting piece 114 may be substantially perpendicular to supports 110, 112 and connected at a left end to left support 112 and at a right end to right support 110. Backup structure 104 is described further below with respect to FIG. 3.

Mounting plate 106 may be configured to connect truss 102 to backup structure 104. Mounting plate 106 may be a substantially rectangular piece of material. Mounting plate 106 may comprise various connecting points for connecting truss 102 and backup structure 104 thereto as discussed further below with respect to FIG. 4.

Figure 2A:
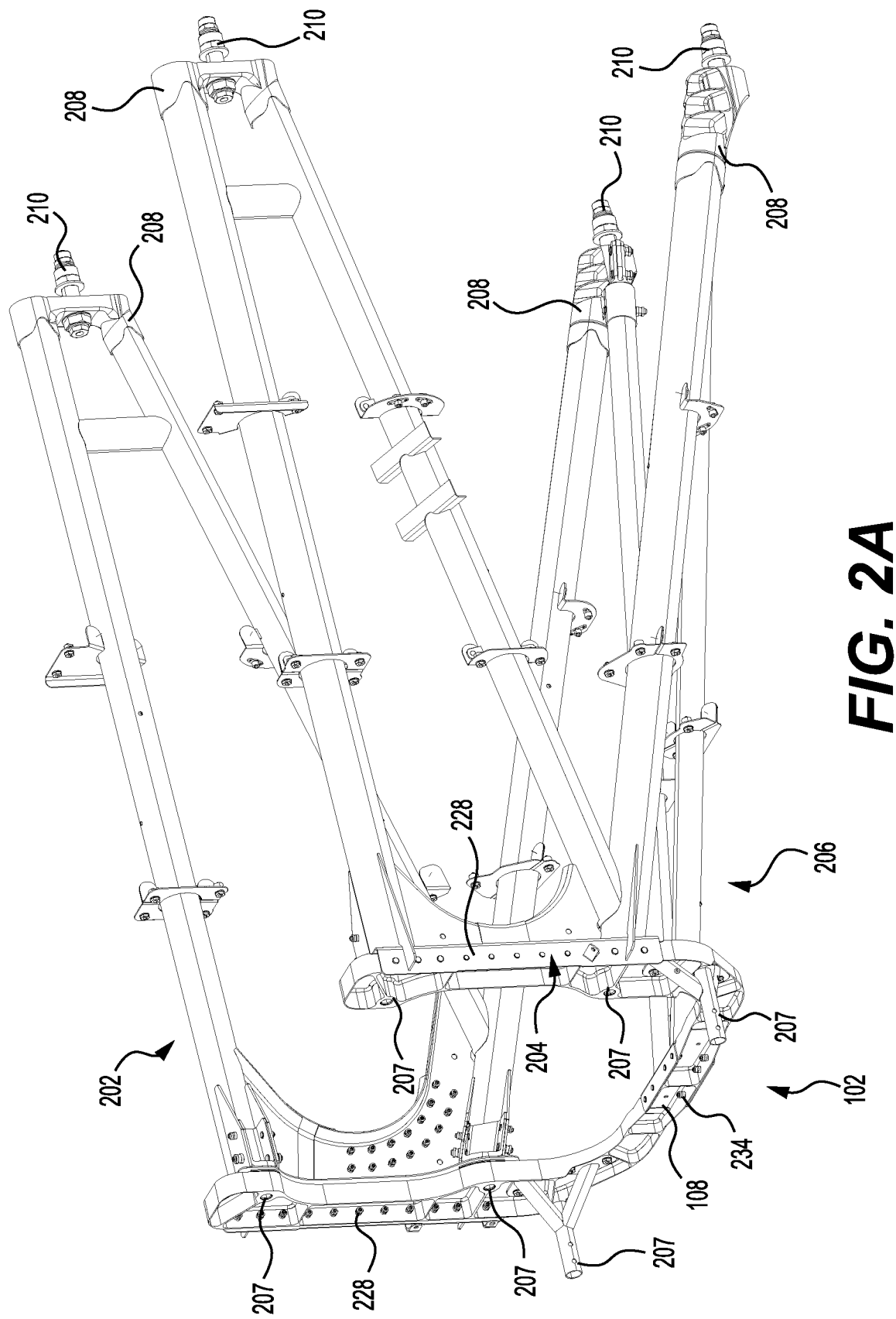
FIG. 2A illustrates a first view of a truss for the engine support truss assembly for some embodiments.

FIG. 2A illustrates truss 102 for some embodiments. In some embodiments, truss 102 comprises a left section 204, a right section 202, and a bottom section 206. Truss 102 may also comprise a collar 108 coupled to sections 202, 204, 206 for mounting an engine (see FIG. 2D) thereto. Collar 108 may comprise 4340 steel, in embodiments. In some embodiments, left section 204 and right section 202 comprise three members extending from collar 108 to mounting plate 106

(see FIG. 1). In some embodiments, bottom section 206 comprises two members extending from collar 108 to mounting plate 106 (see FIG. 1). It should be noted that left section 204 and right section 202 are not limited to comprising three members and may comprise any number of structural members. Similarly, bottom section 206 may comprise less or more than two structural members. The structural members may comprise various brackets attached to an outer surface as shown. In some embodiments, the structural members extending from left section 204 and right section 202 are coupled to collar 108 via side flanges 228 (see FIGS. 2E-2F), and the structural members extending from bottom section 206 are coupled to collar 108 via bottom flange 234. The structural members may be coupled to mounting plate 106 via nodes 208, and may be fastened to mounting plate 106 via fasteners 210 as shown. In some embodiments, fasteners 210 comprise bolts, screws, nuts, rivets, welds or any combination thereof.

In some embodiments, collar 108 comprises a plurality of mounting points 207 to which the isolators 109 may be mounted. Mounting points 207 may comprise holes, tubes, bars, bolts, couplings, spacers, sandwich mounts, and other like attaching means.

Figure 2B:
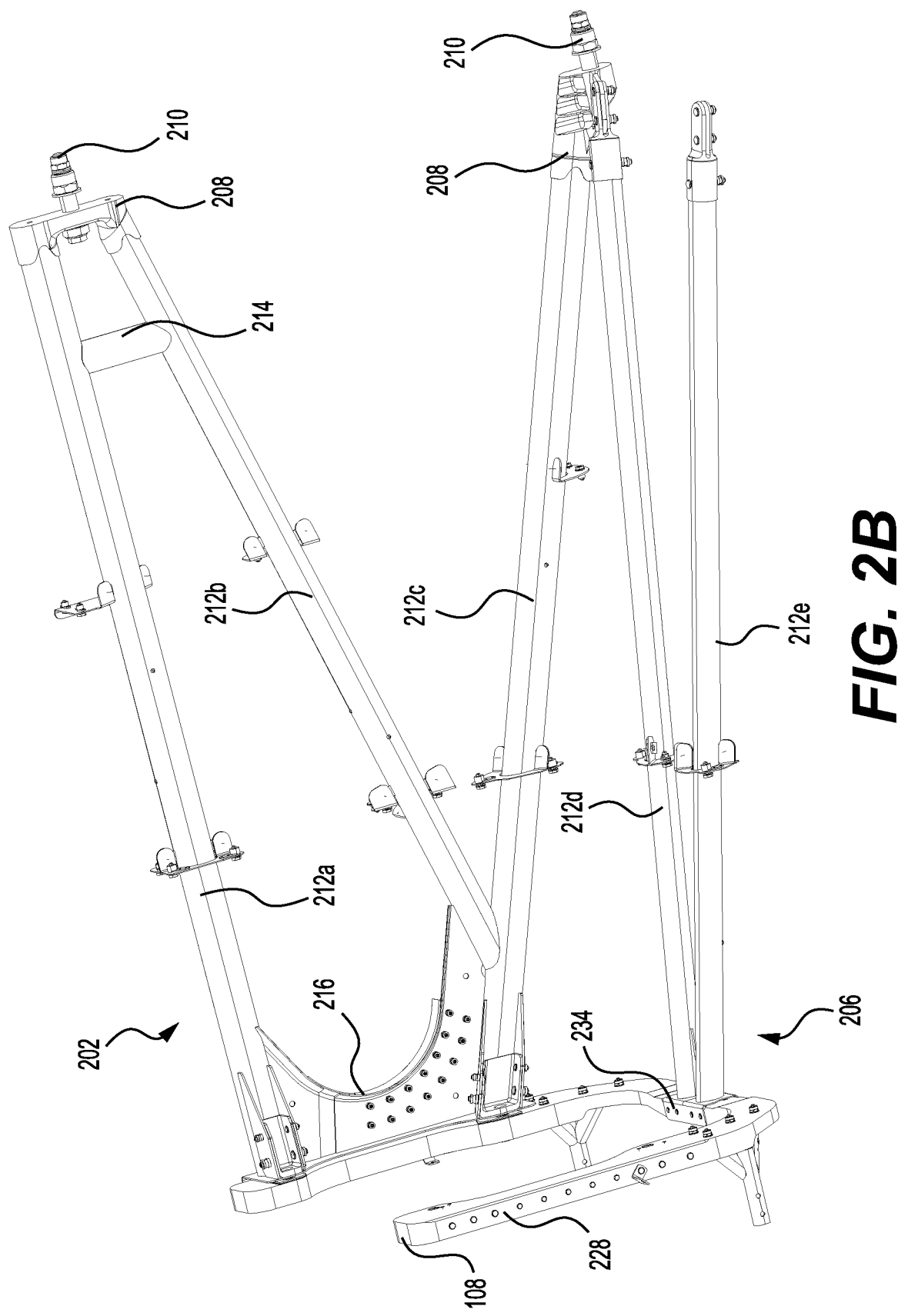
FIG. 2B illustrates a second view of the truss for the engine support truss assembly for some embodiments.

FIG. 2B illustrates right section 202, bottom section 206, and collar 108 of truss 102 for some embodiments. Left section 204 has been omitted from FIG. 2B for clarity of illustration. As described above, right section 202 may comprise a first member 212a, a second member 212b, and a third member 212c. In some embodiments, members 212a, 212b, 212c are substantially cylindrical members. Members 212a, 212b, 212c may be hollow or solid and comprise 17-4PH steel. In some embodiments, members 212a, 212b, 212c comprise a width or diameter of about 35 to about 55 mm.

In some embodiments, first member 212a extends substantially perpendicularly from collar 108 and towards an upper end of mounting plate 106. Second member 212b may extend counterclockwise from third member 212c at an angle of about 30° to about 45°. In some embodiments, right section 202 comprises a crossbar 214 connecting first member 212a and second member 212b. Crossbar 214 may provide additional support for truss 102. In some embodiments, crossbar 214 comprises 17-4PH steel. Crossbar 214 may be a hollow or solid bar. As described above, first member 212a and second member 212b may be attached to mounting plate 106 via node 208. In some embodiments, members 212a, 212b are inserted into node 208 and welded thereto. In some embodiments, members 212a, 212b are connected to node 208 via a bolt, screw, pin, or other fastener inserted through an outer surface of node 208 and into members 212a, 212b.

In some embodiments, right section 202 comprises a right supporting plate 216. Right supporting plate 216 may be connected to first member 212a, second member 212b, third member 212c, and collar 108 and fastened thereto (e.g., via welds and/or bolts). Right supporting plate 216 may be a substantially flat piece of material (e.g., 17-4PH steel) configured to provide additional structural support for truss 102.

Bottom section 206 may comprise a fourth member 212d and a fifth member 212e in some embodiments. Fourth member 212d may be connected to third member 212c at a node 208. Members 212c, 212d may connected to node 208 via welds or fasteners as described above. Fifth member 212e may connect to an eighth member 212h (see FIG. 2C) of left section 204. In some embodiments, members 212d, 212e comprise a diameter of about 25 to about 40 mm.

Figure 2C:
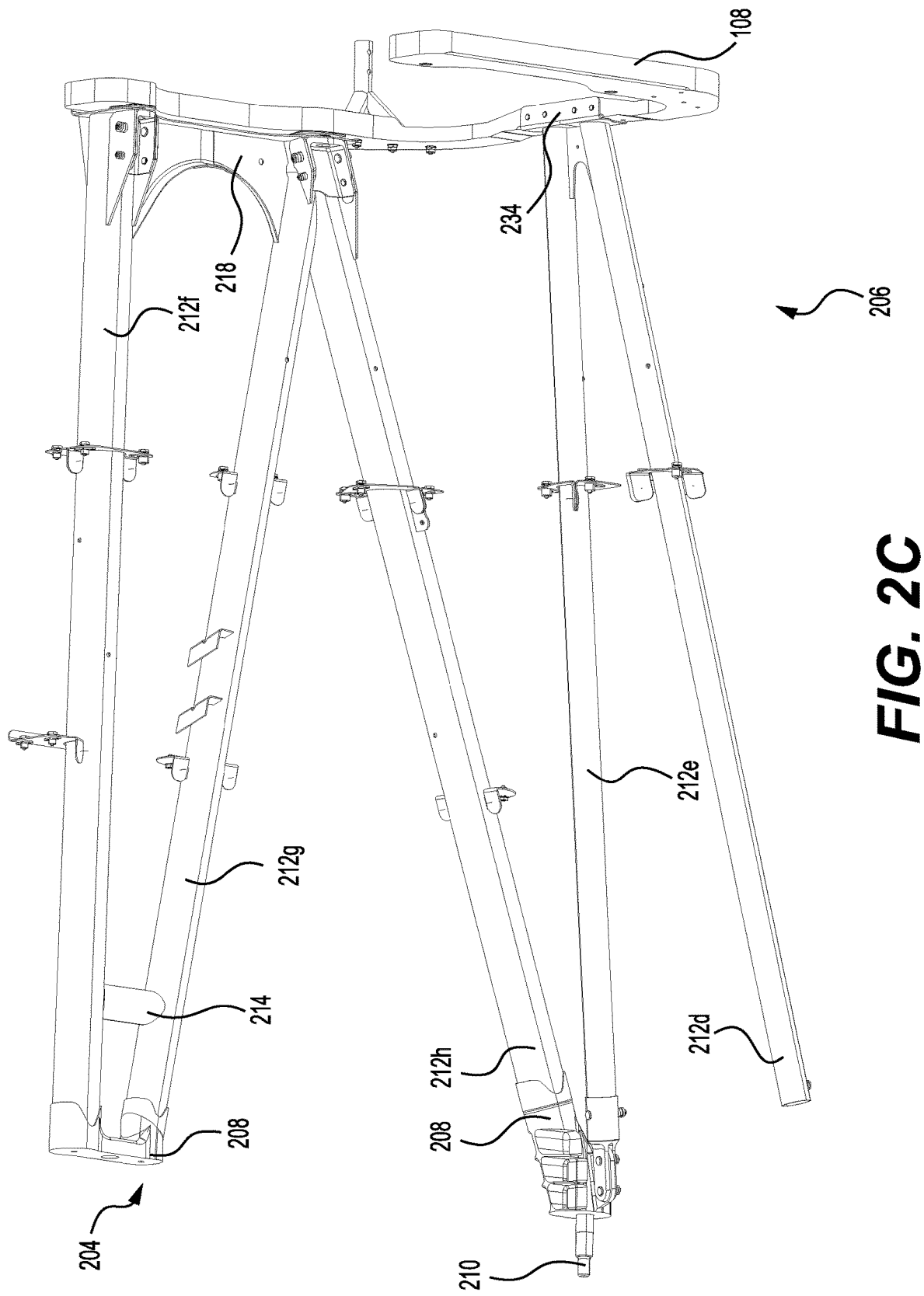
FIG. 2C illustrates a third view of the truss for the engine support truss assembly for some embodiments.

FIG. 2C illustrates left section 204, bottom section 206, and collar 108 of truss 102 for some embodiments. Right section 202 has been omitted from FIG. 2C for clarity of illustration. Left section 204 may comprise sixth member 212f, seventh member 212g, and eighth member 212h. In some embodiments, sixth member 212f extends substantially perpendicularly from collar 108 and towards an upper end of mounting plate 106. Sixth member 212f may be substantially parallel to first member 212a. Seventh member 212g may extend clockwise from eighth member 212h at an angle of about 30° to about 45°. In some embodiments, left section 204 comprises a crossbar 214 connecting sixth member 212f to seventh member 212g. Crossbar 214 may provide additional support for left section 204. Sixth member 212f and seventh member 212g may be connected to one another and mounting plate 106 via a node 208. Eighth member 212h may be connected to fifth member 212e via a node 208 disposed substantially near the bottom of mounting plate 106. In some embodiments, members 212f, 212g, 212h comprise a diameter of about 35 to about 55 mm.

Typically, during initial aircraft design, the engine is positioned to maximize performance. This positioning often does not correlate with an optimal position for the structure of the truss assembly 100. Consequently, the geometry of members 212a-h is often unfavorable such that some members 212a-h may have centerlines that intersect in acute angles that are near parallel. These acute angles lead to difficulty in welding. As such, nodes 208 may be used to separate the members 212a-h of truss 102. By separating members 212a-h, which comprise open space-constrained joints, joint geometry may be improved, thereby improving access to the joints. Prior truss designs often welded members 212a-h together at mounting plate 106. For example, members 212f, 212g would be welded to one another, thereby leading to clearances unsuitable for automated welding. Nodes 208 improve access for welding equipment to reach joints at pairs of adjoining structural members 212a-h by providing a gap between the adjoining structural members. As such, nodes 208 enable increased weldability and may facilitate robotic welding. In some embodiments, nodes 208 are machined. By machining nodes 208 and improving the dimensionality, the thickness of nodes 208 may be customized to improve the transition from the thin-walled tubular members to the thick wall of mounting plate 106, thereby leading to a more weight-optimized design.

In some embodiments, left section 204 comprises a left supporting plate 218. Left supporting plate 218 may be connected to sixth member 212f, seventh member 212g, eighth member 212h, and collar 108 and fastened thereto (e.g., via welds and/or bolts). Left supporting plate 218 may be a substantially flat piece of material (e.g., 17-4PH steel) configured to provide additional structural support for truss 102.

Figure 2D:
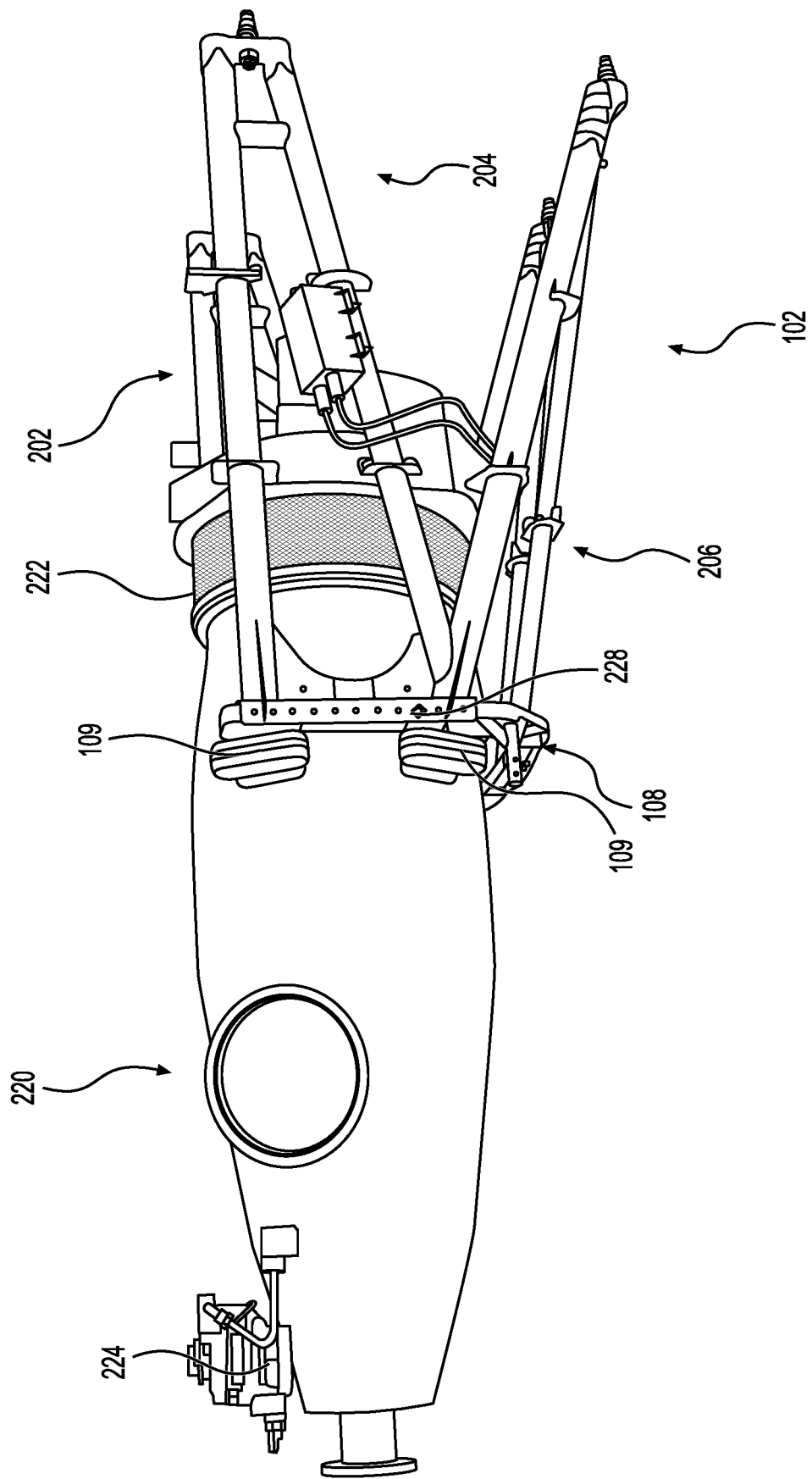
FIG. 2D illustrates the truss with an engine mounted therein for some embodiments.

FIG. 2D illustrates truss 102 with an engine 220 mounted thereto. Engine 220 may be coupled to isolators 109 disposed on collar 108 as shown. Isolators 109 may be coupled to engine 220 via bolts and/or welds. Isolators 109 may dampen the vibration transferred from engine 220 to truss 102. An engine distal end 222 of engine 220 may be disposed within truss 102 while an engine proximal end 224 may extend substantially perpendicular from collar 108 of truss 102.

FIGS. 2E and 2F illustrate close-up views of side flange 228 and collar 108 to show a pre-defined shim 226 designed into truss 102 along a slip plane 231 (see FIG. 2F) for some embodiments. The thrust angle of engine 220 is affected by the angle to which engine 220 is mounted to the aircraft. The thrust angle represents the alignment of engine 220 relative to the center line of the aircraft. Prior truss designs require additional manufacturing operations such as shimming, tack-welding, and flame-straightening to correct for part fitment, weld tolerances, and warpage resulting from welding and heat-treatment. As such, typical trusses are shimmed between the truss and the aircraft firewall to obtain the desired thrust angle. These shim adjustments are operator-dependent and are typically carried out in finite increments, leading to a "close-enough" final alignment of engine 220. To alleviate the need for shimming truss 102, pre-defined shim 226 may be introduced into the truss 102. Use of pre-defined shim 226 may also alleviate the need for additional welding operations after heat-treating truss 102. Slip plane 231 is allowed to "slip" while collar 108 is oriented to the proper direction (e.g., setting engine thrustline), and then fasteners are drilled through flange 228 to secure that joint. Pre-defined shim 226 prevents having a gap between components of truss 102 and collar 108 that could lead to distortion when the bolts or fasteners are installed and tightened.

Pre-defined shim 226 may be located between collar 108 and side flange 228 as best viewed in FIG. 2F. In embodiments, pre-defined shim 226 comprises a constant-thickness, thin, flat member. In embodiments, pre-defined shim 226 comprises a series of constant-thickness, thin, flat members that are stacked upon one another (not shown). FIG. 2F shows pre-defined shim 226 at the end of 212*a*; however, pre-defined shim 226 may be used between collar 108 and any structural members 212*a-h* abutting collar 108, such as the exemplary positions shown in FIG. 2G.

FIG. 2G illustrates locations of pre-defined shims 226 for the engine support truss assembly for some embodiments. In the embodiment depicted in FIG. 2G, five pre-defined shims 226 are used at the four corners of collar 108 and at bottom flange 234. However, fewer or greater than five slip plane positions may be employed without departing from the scope hereof.

Although pre-defined shims 226 are used to replace shimming to obtain a desired engine thrust angle, shimming may be used for alignment of truss 102 at other locations, as well as for alignment of backup structure 104, without departing from the scope hereof. For example, other shims may be used while assembling truss assembly 100 in select areas to ensure proper fitment of structural elements.

Side flanges 228 may comprise an angle of about 90° and coupled to members 212*a-h* at a first face 230*a* and to collar 108 at a second face 230*b*. In some embodiments, slip plane 231 is oriented substantially parallel to a center-plane of the aircraft. Slip plane 231 and pre-defined shim 226 are configured to provide adjustability of the mounting angle of engine 220 such that no subsequent shimming is required to obtain the desired mounting angle. An alignment tool may be used to adjust a bolted joint that controls the pitch and yaw alignments of engine 220. Further, engine 220 may be mounted independently from movement of truss 102. By providing this adjustability, the amount of time required to install engine 220 is reduced because trial and error in shimming truss 102 to achieve the desired mounting angle is obviated. Once the desired angle is achieved, matching holes may be drilled through collar 108 and side flange 228 and fasteners 232 inserted therethrough to secure the alignment in place.

Figure 3:
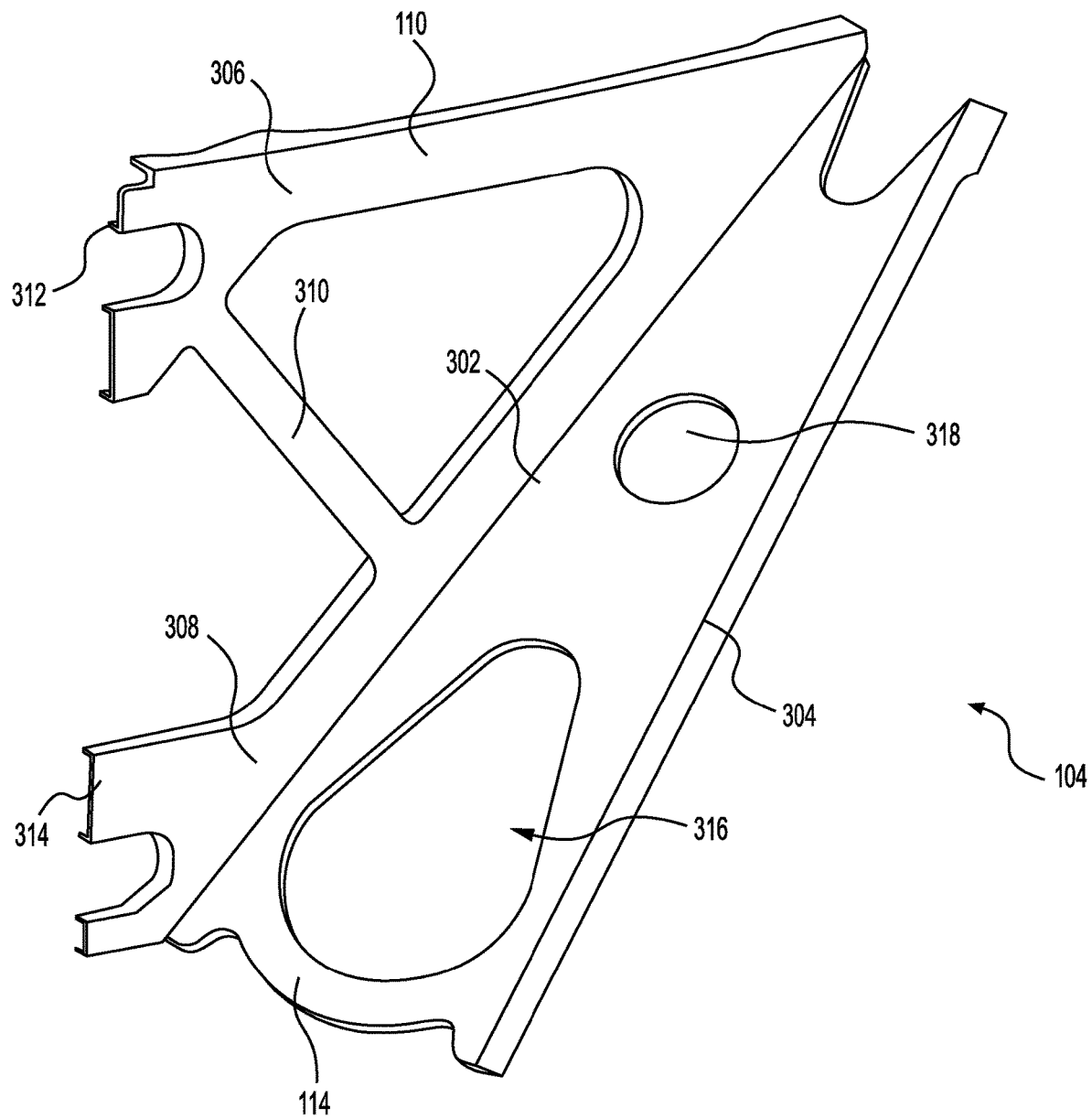
FIG. 3 illustrates a backup structure for the engine support truss assembly for some embodiments.

FIG. 3 illustrates backup structure 104 with left support 112 omitted for clarity of illustration for some embodiments. As described above, backup structure 104 may provide additional support for truss 102 by mechanically coupling to a separate aircraft structure different from an aircraft structure to which truss 102 is mechanically coupled. Backup structure 104 may aid engine support truss assembly 100 in the event that any of the components of truss 102 fail. Modern aircraft regulations require truss 102 to carry flight loads while significant regions of truss 102 are assumed to be failed. As such, backup structure 104 may provide the additional support to withstand the flight loads in the event of a failure. In some embodiments, backup structure 104 comprises aluminum, titanium, stainless steel, or other like metals. Right support 110 and left support 112 may be substantially similar. As described above, connecting piece 114 may connect to right support 110 at a right end 302 and to left support 112 at a left end 304. In some embodiments, connecting piece 114 is connected to supports 110, 112 via welds, bolts, screws, or a combination thereof.

Supports 110, 112, may be substantially triangular. Supports 110, 112 may comprise an upper arm 306 and a lower arm 308 forming two sections of the substantially triangular shape of supports 110, 112, with the third section formed by mounting plate 106. Supports 110, 112 may comprise a connecting arm 310 connecting upper arm 306 to lower arm 308. In some embodiments, connecting arm 310 is substantially rectangular or cylindrical. In some embodiments, connecting arm 310 extends substantially perpendicularly from arms 306, 308. Supports 110, 112 may connect to mounting plate 106 at a first connecting end 312 of upper arm 306 and at a second connecting end 314 of lower arm 308. Connecting ends 312, 314 may be substantially U-shaped. In some embodiments, arms 306, 308 are configured to mount to mounting plate 106 via screws, bolts, rivets, welds, or the like.

Connecting piece 114 may comprise a substantially flat sheet of material with a first opening 316 and a second opening 318 extending therethrough. In some embodiments, first opening 316 is disposed substantially near lower arm 308 of supports 110, 112. In some embodiments, second opening 318 is disposed substantially near upper arm 306 of supports 110, 112. In some embodiments, second opening 318 is substantially circular. In some embodiments, backup structure 104 is substantially symmetrical about the illustrated dashed line (extending vertically through the centers of openings 316, 318).

Figure 4:
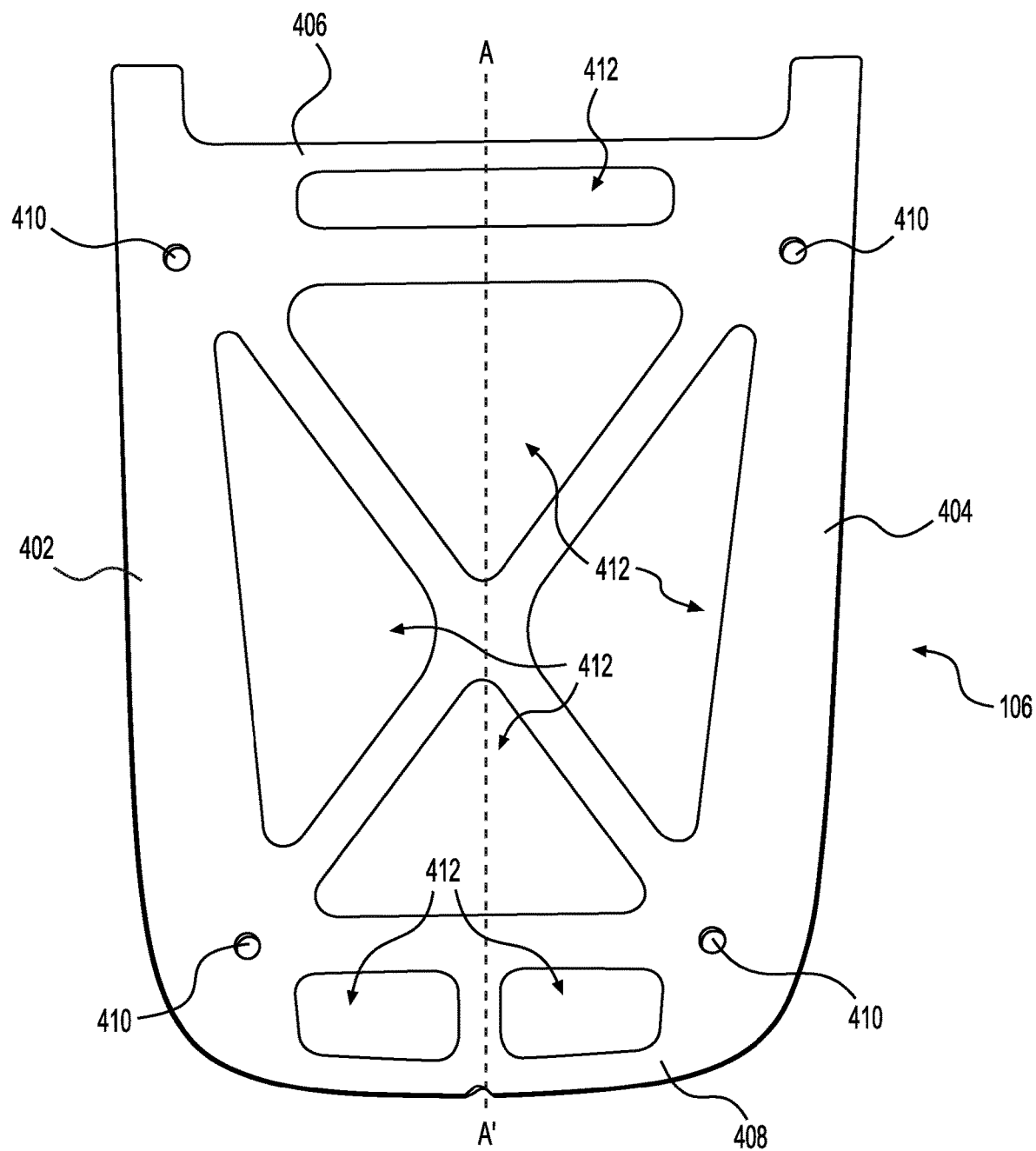
FIG. 4 illustrates a mounting plate for the engine support truss assembly for some embodiments.

FIG. 4 illustrates a front planar view of mounting plate 106 for some embodiments. Mounting plate 106 may be substantially rectangular. In some embodiments, mounting plate 106 comprises steel (e.g., 17-4PH steel), titanium, aluminum, or other like metals. Mounting plate 106 may comprise a left end 402, a right end 404, an upper end 406, and a lower end 408 in some embodiments. Mounting plate 106 may comprise holes 410 for receiving fasteners 210 therein. As best illustrated in FIG. 1, connecting ends 312, 314 of backup structure 104 may be connected to a backside of mounting plate 106 around holes 410 such that one arm of connecting ends 312, 314 is disposed above holes 410, and a second arm of connecting ends 312, 314 is disposed below holes 410. In some embodiments, mounting plate 106 is about 0.5 to about 0.9 meters in width from left end 402 to right end 404. In some embodiments, mounting plate 106 is about 0.8 to about 1.2 meters in height from lower end 408 to upper end 406.

As shown, mounting plate 106 may comprise openings 412 throughout the body. Upper end 406 may comprise a substantially stadium-shaped or cylindrical opening 412. Lower end 408 may comprise two substantially rectangular, square, or circular openings 412. The middle section of mounting plate 106 may comprise four openings 412 formed by a substantially X-shape portion of material as shown. In some embodiments, mounting plate 106 is substantially symmetrical about the vertical dashed line as shown.

Figure 5:
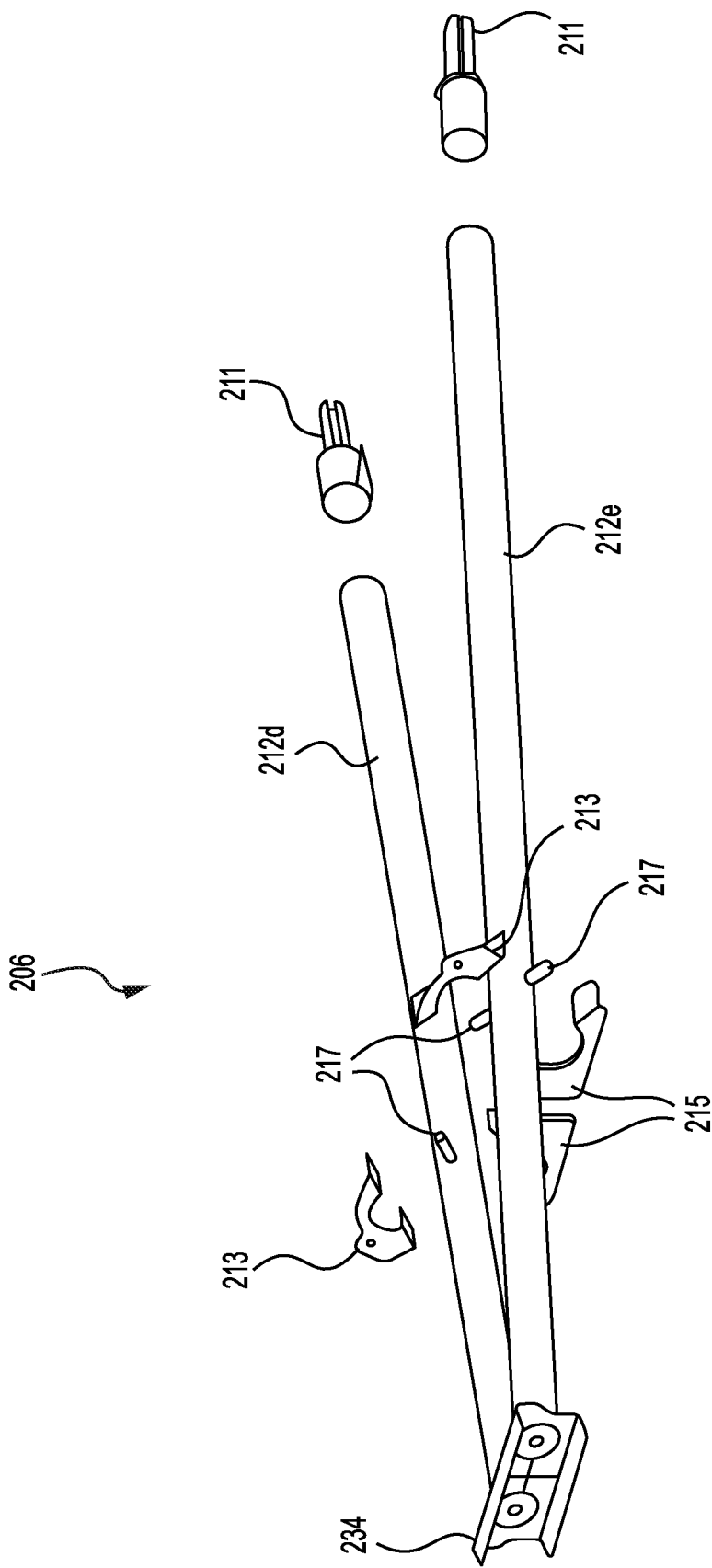
FIG. 5 is an exploded view showing key brackets that use slip joints rather than being welded to the structural members, in an embodiment.

FIG. 5 is an exploded view of bottom section 206 having key brackets that use slip joints rather than being welded to the structural members, in an embodiment. For example, on each of fourth member 212d and fifth member 212e, a top key bracket 213 and a bottom key bracket 215 are configured to be fastened to one another. Each of the key brackets 213, 215 comprises a rounded notch configured to receive the structural member. Tabs 217 are fixed (e.g., welded) to fourth member 212d and fifth member 212e as shown in FIG. 5. Key brackets 213, 215 attached to tabs 217 and are provided a "float" in a forward/aft direction which allows for final fitting the brackets 213, 215. The key brackets 213, 215 are fastened (e.g., via rivets) to tabs 217 in order to form the slip joint around the structural member. By using a slip joint, rather than fixing the brackets 213, 215 to the structural members 212d, 212e, alignment of mating parts throughout truss assembly 100 is facilitated during the assembly process. The use of slip points is shown in FIG. 5 for bottom section 206 as an example, which may be repeated for right section 202 and left section 204, in embodiments.

In the embodiment depicted in FIG. 5, slip-joint fittings 211 have fittings that provide slip joints rather than being welded to fourth member 212d and fifth member 212e. The slip-joint fittings 211 may be used to provide proper alignment between bottom section 206 and right section 202, between bottom section 206 and left section 204, and/or between bottom section 206 and an aircraft structure during assembly and installation. The protruding ends of slip-joint fittings 211 provide attachments for fastening bottom section 206 to an aircraft structure, similar to fasteners 210 described above.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An engine support truss assembly for aircraft, the engine support truss assembly comprising:
 a mounting plate having a front side and a back side opposite the front side;
 a truss structure mechanically coupled to the front side of the mounting plate, wherein the truss structure comprises a plurality of structural members each comprising precipitation-hardened stainless steel;
 a backup structure mechanically coupled to the back side of the mounting plate, wherein the backup structure is configured to provide mechanical support to the truss structure;
 a machined collar mechanically coupled to the truss structure opposite the mounting plate, wherein the machined collar comprises a first side facing the mounting plate and an outer edge;
 a flange fastened to the outer edge of the machined collar, wherein the flange comprises a bend such that a portion of the flange extends partially over the first side of the machined collar;
 a slip plane comprising a gap formed between the portion of the flange and the first side of the machined collar, wherein the slip plane is configured to allow adjustment of a thrust angle of an engine; and
 a pre-defined shim configured for sliding into the gap after the thrust angle of the engine has been adjusted.

2. The engine support truss assembly of claim 1, wherein the slip plane is oriented substantially parallel to a centerplane of an aircraft.

3. The engine support truss assembly of claim 1, comprising a plurality of truss nodes each configured for connecting the structural members to one another, wherein each of the truss nodes comprises a fitting configured for inserting one of the structural members therein.

4. The engine support truss assembly of claim 3, wherein each of the truss nodes is configured to provide a gap between structural members at joints connecting the structural members, thereby providing increased clearances around the joints for improving weldability and facilitating robotic welding of the structural members.

5. The engine support truss assembly of claim 1, comprising a plurality of vibration isolators mounted externally to the collar, wherein the vibration isolators are configured to abut an engine for dampening vibrations transferred from the engine to the truss structure.

6. The engine support truss assembly of claim 1, wherein the backup structure is configured to provide additional support for withstanding flight loads in the event of a failure in the truss structure.

7. The engine support truss assembly of claim 1, comprising a pair of key brackets configured to form a slip joint around one of the structural members, wherein the slip joint is unwelded for facilitating alignment of mating parts throughout assembly of the truss structure.

8. The engine support truss assembly of claim 1, comprising a fastener having a fitting configured to provide a slip joint at an end of one of the structural members.

9. An engine truss for aircraft, comprising:
 a primary truss structure comprising a plurality of structural members each comprising 17-4PH precipitation-hardened stainless steel;
 a secondary truss structure comprising a plurality of structural members, wherein the secondary truss structure is configured to provide mechanical support to the primary truss structure;
 a mounting plate having a first side configured for mounting to the primary truss structure and a second side configured for mounting to the secondary truss structure;
 a machined collar mechanically coupled to the primary truss structure opposite the mounting plate, wherein the structural members of the primary truss structure are each coupled to the machined collar via a flange, with each flange being configured to form a gap between a respective structural member and the machined collar; and
 a plurality of vibration isolators mounted externally to the collar, wherein the vibration isolators are configured to abut an engine for dampening vibrations transferred from the engine to the engine truss.

10. The engine truss of claim 9, comprising a slip plane within the gap between the machined collar and the flange, wherein the slip plane is configured to enable adjustability of an engine mount angle with one or more pre-defined shims configured for sliding along the slip plane within the gap.

11. The engine truss of claim 9, comprising a plurality of truss nodes, wherein each of the truss nodes is configured to receive ends of a pair of adjoining structural members.

12. The engine truss of claim 11, wherein each of the truss nodes forms a joint between the pair of adjoining structural members, wherein the joint provides sufficient clearance between the pair of adjoining structural members to enable improved weldability and robotic welding therein.

* * * * *